United States Patent
Kim et al.

(10) Patent No.: US 9,584,058 B2
(45) Date of Patent: Feb. 28, 2017

(54) SYSTEM AND METHOD FOR ESTIMATING TEMPERATURE OF ROTOR OF MOTOR

(71) Applicant: Hyundai Motor Company, Seoul (KR)

(72) Inventors: Young Jun Kim, Gyeonggi-Do (KR); Jeong Min Shin, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 18 days.

(21) Appl. No.: 14/467,659

(22) Filed: Aug. 25, 2014

(65) Prior Publication Data
US 2015/0295531 A1    Oct. 15, 2015

(30) Foreign Application Priority Data
Apr. 14, 2014    (KR) .......................... 10-2014-0044239

(51) Int. Cl.
*H02H 7/09* (2006.01)
*H02P 23/14* (2006.01)
(Continued)

(52) U.S. Cl.
CPC .............. *H02P 23/14* (2013.01); *G01K 13/08* (2013.01); *H02P 23/0077* (2013.01)

(58) Field of Classification Search
CPC . G01R 31/343; B60L 15/025; B60L 2220/12; B60L 2240/423; B60L 2240/425; B60L 2260/44; B60L 2260/56; G01K 13/00; G01K 13/08; G01K 7/00; G01K 7/42; H02K 11/001; H02P 21/14; H02P 21/145
(Continued)

(56) References Cited

U.S. PATENT DOCUMENTS

| 5,278,485 A | 1/1994 | Kim |
| 2011/0050141 A1* | 3/2011 | Yeh .......................... H02P 6/08 318/434 |

(Continued)

FOREIGN PATENT DOCUMENTS

| EP | 2058941 A1 | 5/2009 |
| EP | 2447121 A2 | 5/2012 |

(Continued)

OTHER PUBLICATIONS

European Search Report for European Patent Application No. 14188955.0, dated Oct. 6, 2015, 6 pages.

*Primary Examiner* — Paul Ip
(74) *Attorney, Agent, or Firm* — Mintz Levin Cohn Ferris Glovsky and Popeo, P.C.; Peter F. Corless (57) ABSTRACT

A system and method are provided for estimating temperature of a rotor of a motor configured to calculate temperature of the rotor using an actual measured data-based thermal model (thermal impedance model) and an energy loss model, and to estimate temperature of the rotor using the calculated temperature variation of the rotor. The method includes calculating, by a controller, an energy loss of the motor using driving conditions of the motor. The controller is also configured to calculate a temperature variation of the rotor in a predetermined reference temperature using the calculated energy loss and thermal resistances of the rotor and a stator of the motor. Further, the controller is configured to estimate a rotor temperature in the predetermined reference temperature using the temperature variation of the rotor.

14 Claims, 8 Drawing Sheets

(51) Int. Cl.
*G01K 13/08* (2006.01)
*H02P 23/00* (2016.01)

(58) Field of Classification Search
USPC ............ 318/400.22, 432, 473, 798; 374/183,
374/E07.001; 702/130
See application file for complete search history.

(56) References Cited

U.S. PATENT DOCUMENTS

| | | | | | |
|---|---|---|---|---|---|
| 2011/0279074 | A1* | 11/2011 | Yeh | ............... | G01K 7/42 |
| | | | | | 318/432 |
| 2011/0285342 | A1* | 11/2011 | Campbell | ............ | H02P 21/145 |
| | | | | | 318/798 |
| 2012/0007532 | A1* | 1/2012 | Baglino | ............... | B60L 15/025 |
| | | | | | 318/473 |
| 2013/0028292 | A1* | 1/2013 | Senoo | ............... | G01K 13/00 |
| | | | | | 374/183 |

FOREIGN PATENT DOCUMENTS

| | | |
|---|---|---|
| JP | 2004-229491 A | 8/2004 |
| JP | 2008-199738 A | 8/2008 |
| JP | 2010-142046 A | 6/2010 |
| KR | 10-1993-0006454 | 4/1993 |
| KR | 10-1998-0027741 A | 7/1998 |
| KR | 10-2008-0019212 A | 3/2008 |
| KR | 10-1998-0017741 | 7/2013 |
| KR | 10-2015-0004259 A | 1/2015 |

\* cited by examiner

FIG. 1

RELATED ART

SYSTEM AND METHOD FOR ESTIMATING TEMPERATURE OF ROTOR OF MOTOR

CROSS-REFERENCE TO RELATED APPLICATION

This application claims priority to and the benefit of Korean Patent Application No. 10-2014-0044239 filed in the Korean Intellectual Property Office on Apr. 14, 2014, the entire contents of which are incorporated herein by reference.

BACKGROUND (a) Field of the Invention

The present invention relates to a system and method for estimating temperature of a rotor of a motor, and particularly, to a system and method for estimating temperature of a rotor of a motor to calculate temperature variation of the rotor using a measured data-based thermal model (e.g., thermal impedance model) and an energy loss model to then estimate temperature of the rotor with the temperature variation of the calculated temperature variation of the rotor.

(b) Description of the Related Art

Figure 1:
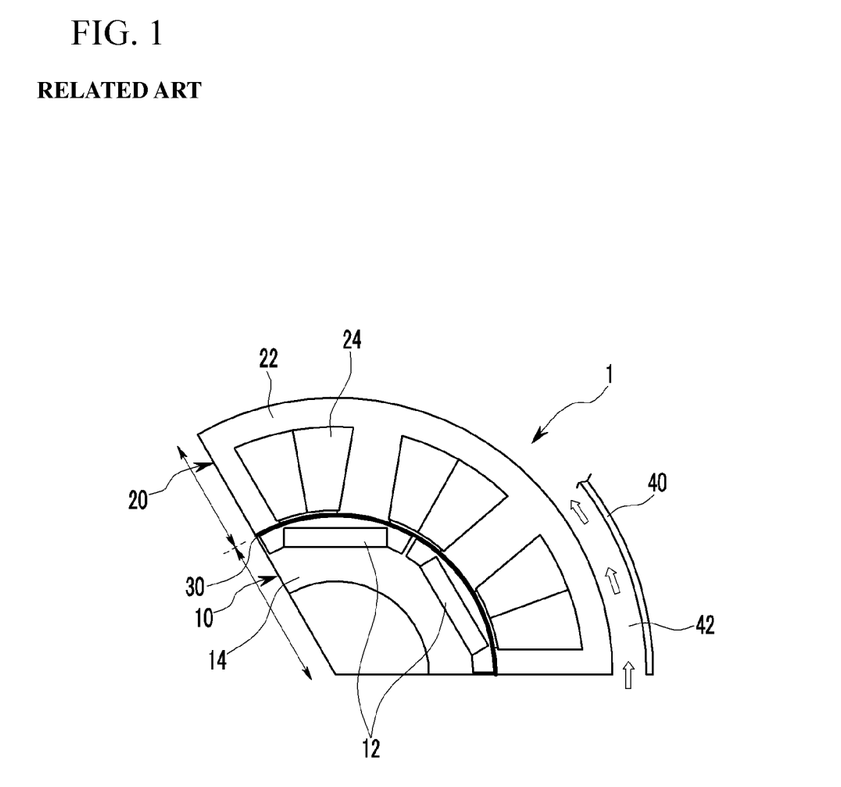
FIG. 1 is an exemplary diagram illustrating a schematic structure of a driving motor used in an environmentally-friendly vehicle according to the related art.

Generally, it is well-known that a motor consists of a stator and a rotor. The stator refers to a fixed portion in the motor, including an iron core that supports a current-flowing coil and a frame to which the iron core is attached. The rotor is a rotatable portion in the motor, including a permanent magnet and an iron core. FIG. 1 is an exemplary drawing illustrating a schematic structure of a driving motor used in an environmentally-friendly vehicle, in which an air gap is formed between the stator 20 and rotor 10, a housing 40 is installed extraneous to the stator 20 to form a cooling channel 42, and oil or coolant flows in the cooling channel 42 to cool a motor 1.

Similar to a general motor, the rotor 10 includes permanent magnets 12 and an iron core 14, and the stator 20 includes an iron core 22 and a coil 24. The motor 1 of the environmentally-friendly vehicle may have different output and control performances as characteristics of the permanent magnets 12 embedded within the rotor 10 are varied. In general, magnetic flux of the permanent magnet 12 decreases as temperature increases, thereby resulting in a decreased output. Thus, to maintain equal torque (e.g., equal output), compensation control is required as temperature of the rotor varies.

However, the permanent magnets 12 are positioned inside of the rotor 10, causing difficult in attaching a temperature sensor configured to detect the permanent magnets 12, and a method for estimating the temperature of the rotor needs to be developed. Meanwhile, a method is known in which a temperature sensor is attached to a stator coil to detect temperature of a stator and the detected temperature of the stator is used to estimate temperature of a motor. However, this known method does not teach estimating temperature of the rotor and thus may not provide appropriate temperature compensation control according to temperature variation of the rotor.

The above information disclosed in this section is merely for enhancement of understanding of the background of the invention and therefore it may contain information that does not form the prior art that is already known in this country to a person of ordinary skill in the art.

SUMMARY

Accordingly, the present invention provides a method for estimating temperature of a rotor of a motor to improve performance and efficiency of a motor control system according to accurate temperature estimation of the rotor and to provide a motor-related fail-safe capability, by using an actual measured data-based thermal model (e.g., thermal impedance model) and an energy loss model that calculate temperature variation of the rotor and then use the calculated temperature variation of the rotor to estimate temperature of the rotor.

For this purpose, an exemplary embodiment of the present invention provides a method for estimating temperature of a rotor of a motor that may include: calculating energy loss of the motor using driving conditions of the motor; calculating temperature variation of the rotor at a predetermined reference temperature using the calculated energy loss and thermal resistances of the rotor and a stator of the motor; and estimating rotor temperature with the predetermined reference temperature using the temperature variation of the rotor.

The motor may be an embedded permanent magnet type of synchronous electric motor. The driving conditions of the motor may include a torque instruction, a motor speed, a reference voltage, and a switching frequency. The predetermined reference temperature may be a cooling temperature of the motor. The calculation of the energy loss of the motor may use response surface modeling and an approximate model as an actual measured data-based energy loss model. In addition, the calculation of the temperature variation of the rotor of the motor may use a thermal impedance model as an actual measured data-based thermal model. The thermal impedance model may be expressed in the following function.

wherein $Z_{th\_total}$ is overall thermal impedance, R is thermal resistance, and t is measurement time.

$$Z_{th\_total}(t) = \sum_{i=1}^{n} R_i \left(1 - e^{-\frac{t}{\tau_i}}\right)$$

Further, another exemplary embodiment of the present invention provides a method for estimating temperature of a rotor of a motor that may include: a motor operating as a driving motor of an environmentally-friendly vehicle; and a controller configured to estimate a temperature of a rotor of the motor. The controller may be operated by a predetermined program for executing the method for estimating temperature of the rotor of the motor.

As described above, according to the exemplary embodiment of the present invention, the method for estimating temperature of the rotor of the motor may be provided to improve the performance and efficiency of the motor control system according to more accurate temperature estimation of the rotor in addition to providing the motor-related fail-safe capability, through the actual measured data-based thermal model (e.g., thermal impedance model) and the energy loss model that calculate the temperature variation of the rotor, and then uses the calculated temperature variation of the rotor to estimate the temperature of the rotor.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. Like reference numerals designate like elements throughout the specification.

Figure 4:
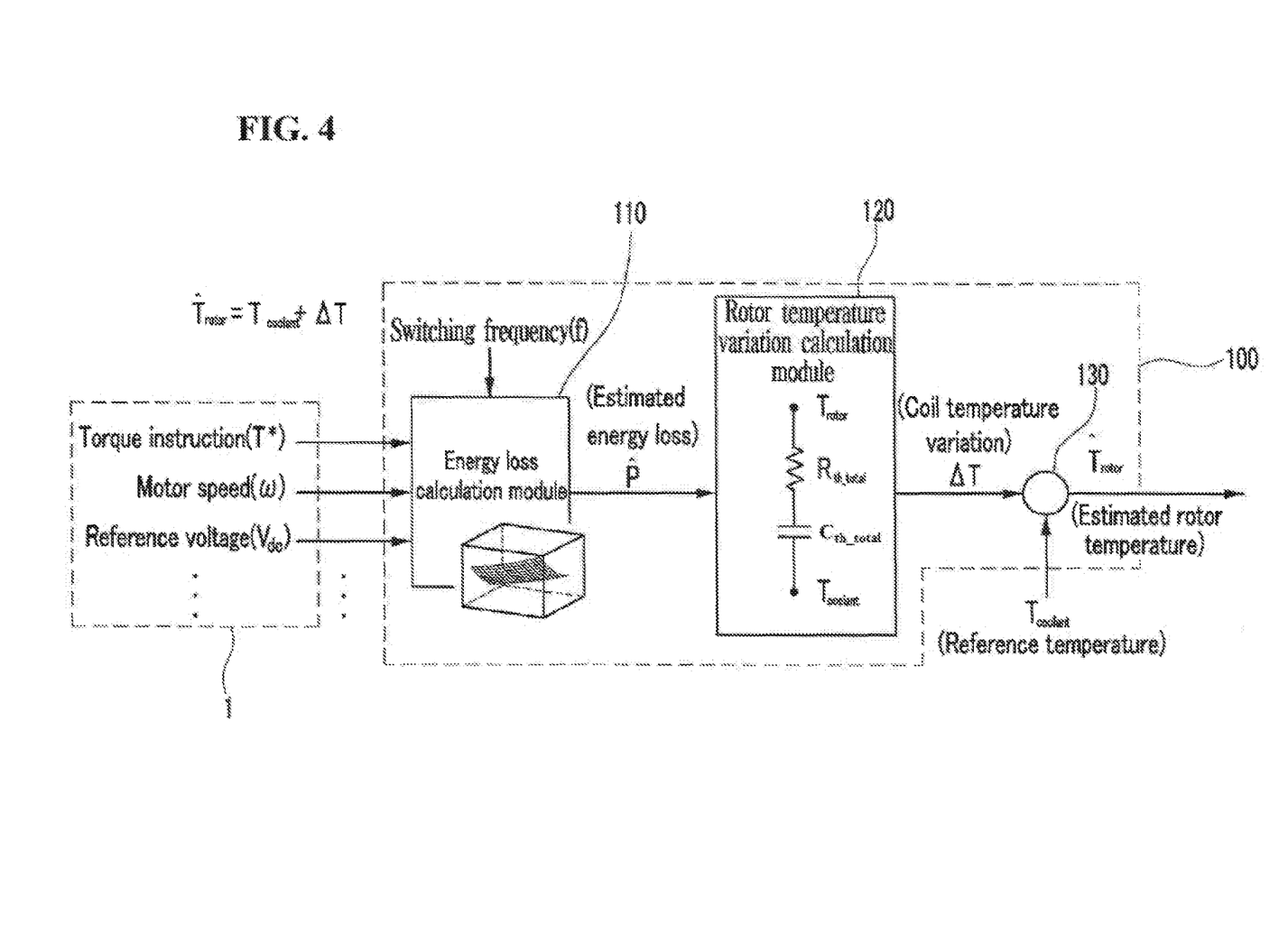
FIG. 4 is an exemplary logic diagram of a method for estimating temperature of the rotor of the motor according to the exemplary embodiment of the present invention.

FIG. 4 is an exemplary drawing illustrating a controller 100 configured to execute logic of a method for estimating temperature of a rotor of a motor according to an exemplary embodiment of the present invention. A controller 100 configured to execute a method for estimating temperature of a rotor of a motor according to an exemplary embodiment of the present invention may include: an energy loss calculation module 110 configured to detect a driving condition of a motor 1 (e.g., including for example, torque instruction, motor speed, reference voltage, etc.) and to calculate an estimated energy loss $\hat{p}$ of the motor 1 with the detected driving condition; a rotor temperature variation calculation module 120 configured to use thermal resistances of the rotor 10 and the stator 100 and the total heat capacity ($C_{th\_total}$) of respective motor parts to calculate the temperature variation ($\Delta T$) of the rotor 10 at a predetermined reference temperature ($T_{coolant}$) using the energy loss calculated by the energy loss calculation module 110; and a rotor temperature estimation module 130 configured to estimate temperature of the rotor 10 ($\hat{T}_{rotor}$) in the predetermined reference temperature using the temperature variation of the rotor 10 calculated by the rotor temperature variation calculation module 120. In particular, the estimated temperature of the rotor 10 may be expressed by $\hat{T}_{rotor} = T_{coolant} \Delta T$.

The motor 1 may be an embedded permanent magnet type of synchronous electric motor used as a driving motor in the environmentally-friendly vehicle, but it should be understood that the scope of the present invention is not limited thereto. Even if the motor is not the embedded permanent magnet type of synchronous electric motor, the technical spirit of the present invention may be applicable to motors in which the permanent magnets are substantially embedded in the rotor. Driving conditions of the motor 1 may include a torque instruction (T$\dot{X}$); for the motor 1, a motor speed ($\omega$), a reference voltage ($V_{dc}$), and a switching frequency (f), and a detailed description of the driving conditions will be omitted since they may be determined by a person of ordinary skill in the art using disclosed technologies.

Figure 2:
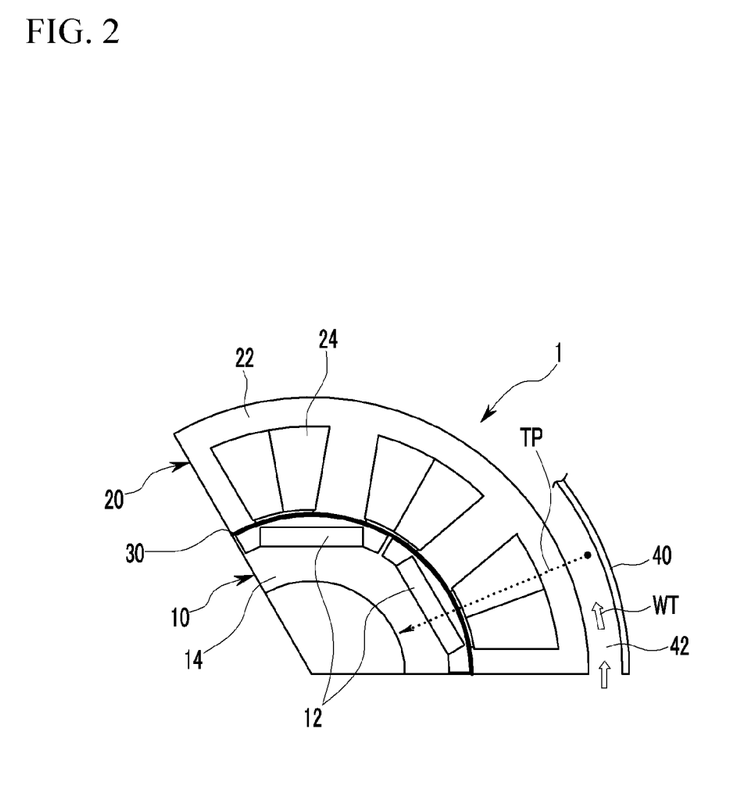
FIG. 2 is an exemplary view of a thermal path to a rotor of the driving motor used in the environmentally-friendly vehicle according to an exemplary embodiment of the present invention.
Figure 3:
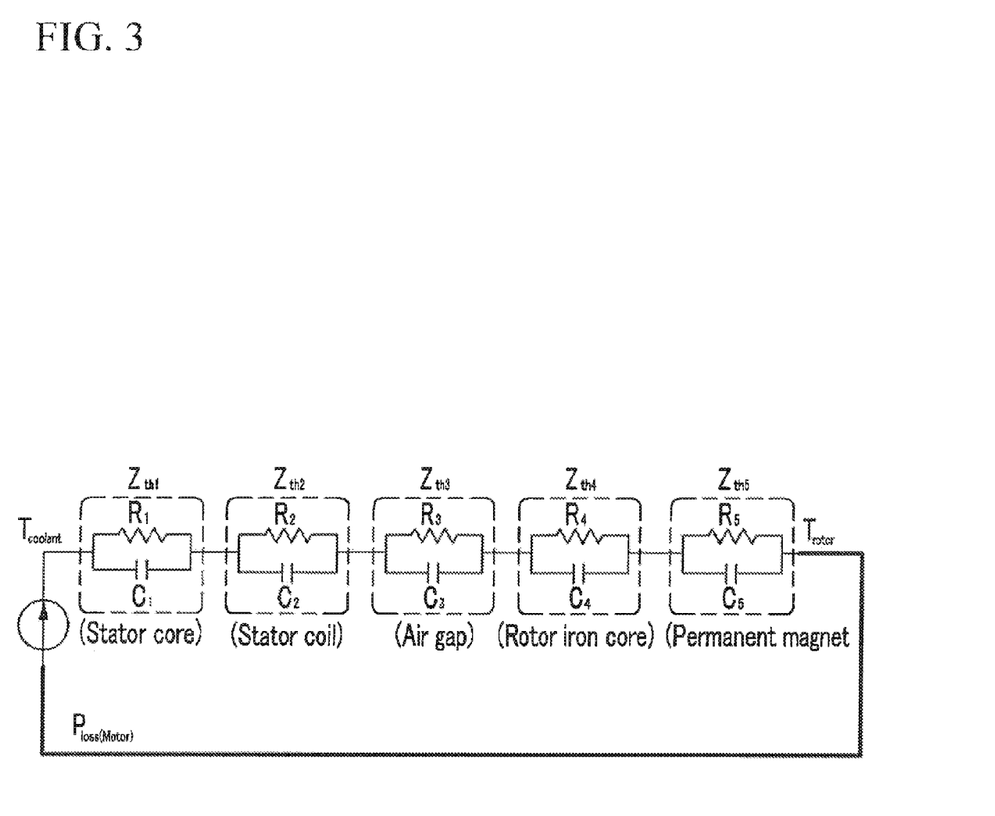
FIG. 3 is an exemplary view illustrating a thermal model of the driving motor used in the environmentally-friendly vehicle according to an exemplary embodiment of the present invention.

The predetermined reference temperature may be a temperature of a coolant or oil that flows in the cooling channel 42 of the motor 1, but it should be understood that the scope of the present invention is not limited thereto. If the predetermined reference temperature is not the temperature of the coolant or oil but a substantially configurable temperature as the reference temperature, the technical spirit of the present invention may be applicable thereto. Energy loss ($P_{loss(Motor)}$) of the motor 1 may be, as shown in FIGS. 2 and 3, a sum of energy lost in a stator core, a stator coil, an air gap, an iron core of the rotor, and the permanent magnets. The energy loss may be calculated from a coolant temperature ($T_{coolant}$) and a rotor temperature ($T_{rotor}$), and the rotor temperature may be estimated using the energy losses and the coolant temperature. In other words, the rotor temperature may be calculated by the following equation and may be estimated when the energy loss and the coolant temperature are disclosed.

In FIG. 2, TP represents a temperature difference between the coolant temperature ($T_{coolant}$) and the rotor temperature ($T_{rotor}$), and WT represents the coolant temperature.

$$R_{th\_total} = \frac{T}{P}$$

In the above equation, P is the known energy loss, T is the difference between the coolant temperature and the rotor temperature, and $R_{th\_total}$ is thermal resistance calculated by FIG. 3 and the following thermal impedance model equation.

$$Z_{th\_total}(t) = Z_{th1} + Z_{th2} + Z_{th3} + Z_{th4} + Z_{th5}$$

$$Z_{th\_total}(t) = \sum_{i=1}^{n} R_i \left(1 - e^{-\frac{t}{\tau_i}}\right)$$

In the above equation, $Z_{th\_total}$ represents overall thermal impedance, R represents thermal resistance, and t represents a measurement time.

Figure 6:
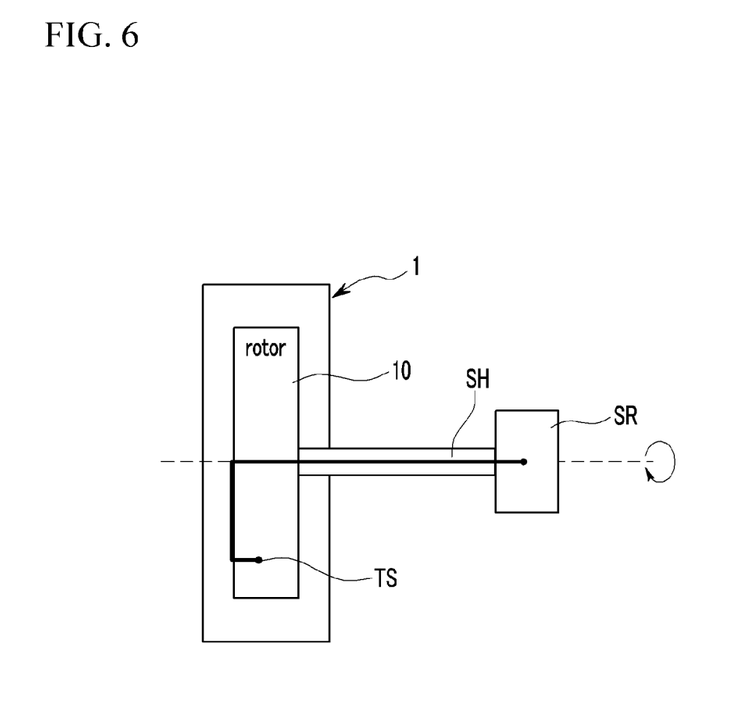
FIG. 6 is an exemplary illustration of measuring the temperature of the rotor of the motor according to an exemplary embodiment of the present invention.

In FIG. 3, $C_i$ (i=1, . . . , 5) represents heat capacities of respective motor parts. In the exemplary embodiment of the present invention, the thermal impedance may be determined by a configuration for measuring actual temperature of the rotor of the motor, as shown in FIG. 6. For example, when a temperature sensor TS is attached inside of the rotor 10 and the temperature sensor TS is coupled to a slip ring SR though an aperture in a shaft SH, the temperature of the rotor 10 may be continuously measured through the slip ring SH and a signal processor (not shown) in a laboratory.

Figure 7:
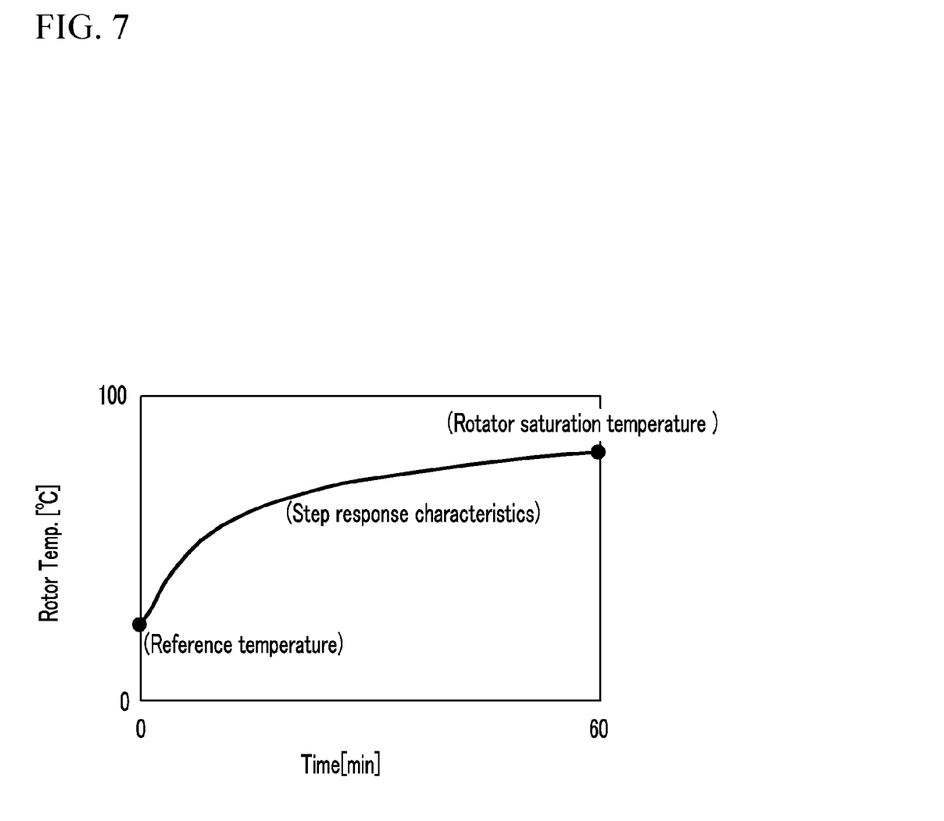
FIG. 7 is an exemplary graph illustrating exemplary temperature variation of the rotor of the motor according to an exemplary embodiment of the present invention.

The temperatures of the rotor 10 measured by the configuration of FIG. 6 may be represented by a graph as shown in FIG. 7. The temperature of the rotor measured in the laboratory may have a step response characteristic, and the temperature of the rotor may be measured multiple times. Losses of the motor 1 may generally consist of copper loss, iron loss, wind loss, friction loss, etc., and accurate loss estimation of the iron loss may be difficult since the iron loss may be affected by a driving current and a rotation speed. Thus, to more accurately estimate the iron loss, experimental data-based loss modeling is recommended, and accordingly, energy loss calculation in the exemplary embodiment of the present invention may use response surface modeling and/or an approximate model as an actual measured data-based energy loss model.

The response surface modeling is, as is well-known to a person of ordinary skill in the art, a statistical analysis method for a response surface formed by variation of responses, when multiple descriptive variables (e.g., independent parameters) complicatedly affect some response variables (e.g., dependent parameters). In other words, functional relations between the independent parameters and the dependent parameters may be assumed from data (e.g., experimental results) to estimate an amount of the response of each dependent parameter according to variations of the independent parameters.

In the exemplary embodiment of the present invention, the independent parameters for the motor energy loss modeling may be the torque instruction (e.g., current), the motor speed, the reference voltage, and the switching frequency, and the dependent parameter may be the energy loss. The response surface modeling may be applied to the exemplary embodiment of the present invention because to estimate the temperature using the aforementioned thermal model, loss estimation according to the driving conditions of the motor 1 (e.g., the independent parameters) may be critical and analysis-based loss estimation may be difficult to apply thereto due to various considered factors.

Figure 8:
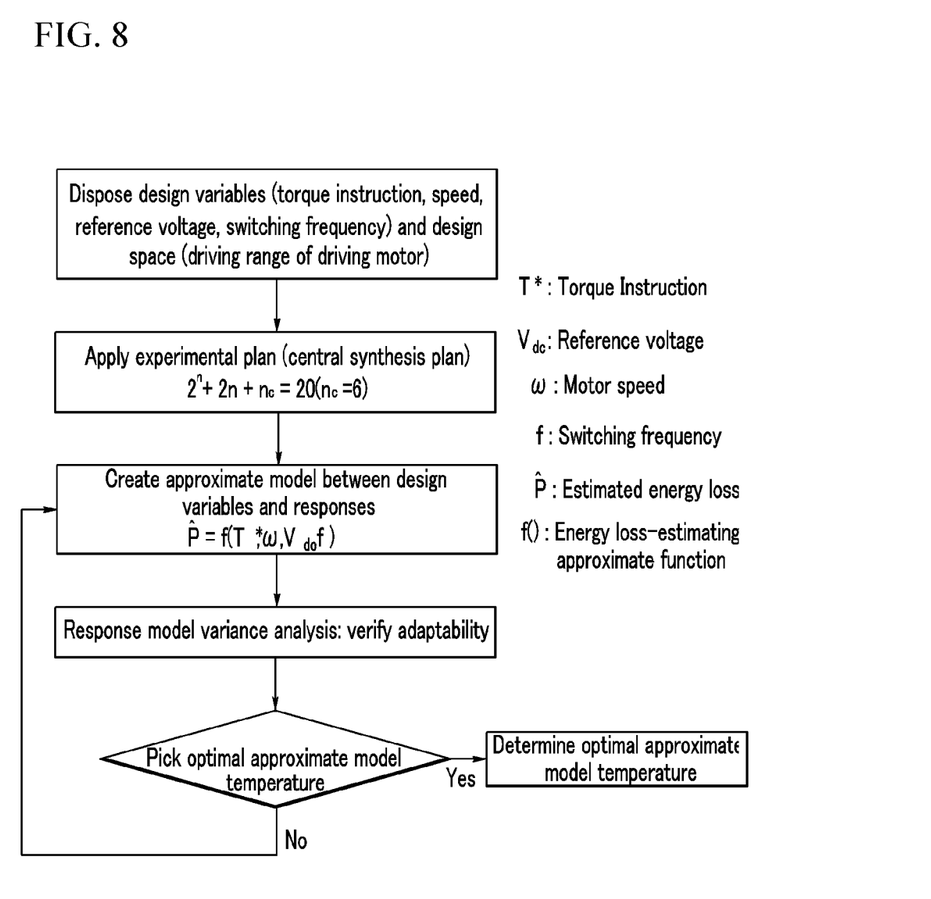
FIG. 8 is an exemplary flowchart for response surface modeling of energy loss applicable to the method for estimating the temperature of the rotor of the motor according to an exemplary embodiment of the present invention.

Thus, in the exemplary embodiment of the present invention, the response surface modeling based on an experimental plan may be used for the energy loss estimation, and through the response surface modeling, the a more accurate approximate response model may be created by performing a minimum number of experiments, thereby reducing a development period of the motor. FIG. 8 illustrates an exemplary process of energy loss-estimating modeling applicable to the exemplary embodiment of the present invention. In other words, the present invention may be configured to determine the optimal approximate model for the energy loss estimation, through the process shown in FIG. 8. After determining the optimal approximate model, the actual model may be replaced by the approximate model, and the approximate model may be used to perform an approximate optimization process.

The approximate optimization process is a method in which a difference between the actual model and the approximate model may be narrowed to converge to optimal design values (model). How to determine the initial approximate model when doing the response surface modeling may determine modeling accuracy (e.g., error level), which is a fact that is well-known to a person of ordinary skill in the art. Equations for the approximate model may be a linear approximate model Equation 1 and a [linear+square] approximate model Equation 2 as follows.

$$\hat{P}=f(T°,\omega,V_{dc},f)=\alpha_0+\alpha_1T°+\alpha_2\omega+\alpha_3V_{dc}+\alpha_4f \qquad \text{Equation 1}$$

$$\hat{P}=\alpha_0+\alpha_1T°+\alpha_2\omega+\alpha_3V_{dc}+\alpha_4f+\alpha_5T°^2+\alpha_6\omega^2+\alpha_7V_{dc}^2+\alpha_8f^2 \qquad \text{Equation 2}$$

$\alpha_0, \alpha_1, \ldots, \alpha_8$: coefficients of the model

In the exemplary embodiment of the present invention, to select or determine a model with optimal accuracy among the approximate models, a model with a minimum error (e.g., =(actual measured loss)−(estimated loss through the model)) under various types of load conditions may be selected. A variance analysis for selecting the optimal model may be applied as a statistical analysis method.

Figure 5:
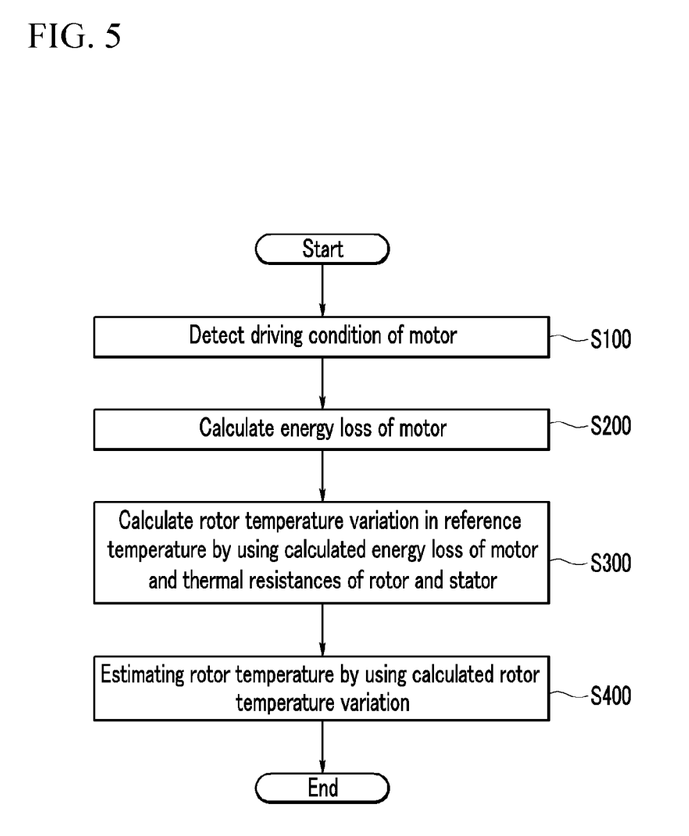
FIG. 5 is an exemplary flowchart of the method for estimating the temperature of the rotor of the motor according to the exemplary embodiment of the present invention.

A method for estimating temperature of a rotor of a motor will now be described in detail with reference to the accompanying drawings. FIG. 5 is an exemplary flowchart of the method for estimating the temperature of the rotor of the motor according to the exemplary embodiment of the present invention. As shown in FIG. 5, the energy loss calculation module 110 of the controller 100 may use the aforementioned energy loss model to calculate energy loss ($\hat{P}$) of the motor 1 using driving conditions of the motor 1 (e.g., a torque instruction, a motor speed, a reference voltage, a switching frequency, etc.) (S100 and S200).

The rotor temperature variation calculation module 120 of the controller 100 may then use the calculated energy loss ($\hat{P}$) and the aforementioned thermal resistance ($R_{th\_total}$) of the rotor 10 and the stator 20 of the motor 1 to calculate temperature variation ($\Delta T$) of the rotor 10 at a predetermined reference temperature (e.g., a coolant temperature) according to the following equation (S300).

$$\Delta T=\hat{P}\times R_{th\_total}$$

Further, the rotor temperature estimation module 130 of the controller 100 may be configured to estimate and output the rotor temperature ($\hat{T}_{rotor}$) using the following equation based on the temperature variation of the rotor in the predetermined reference temperature (S400).

$$\hat{T}_{rotor} = T_{coolant} + \Delta T$$

Accordingly, the actual measured data-based thermal model (e.g., thermal impedance model) and the energy loss model may be used to calculate the temperature variation of the rotor and then the calculated temperature variation of the rotor may be used to estimate the rotor temperature, thereby providing the motor-related fail-safe capability by information about the estimated rotor temperature as well as improving the performance and efficiency of the motor control system by the more accurately estimated rotor temperature.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

1: motor
10: rotor
12: permanent magnet
20: stator
40: housing
42: cooling channel
100: controller
110: energy loss calculation module
120: rotor temperature variation calculation module
130: rotor temperature estimation module

What is claimed is:

1. A method for estimating temperature of a rotor of a motor, comprising:
determining, by an energy loss module, an energy loss of the motor using driving conditions of the motor;
determining, by a rotor temperature variation calculation module, a temperature variation of the rotor at a cooling temperature of the motor using the determined energy loss and thermal resistances of the rotor and a stator of the motor; and
estimating, by an estimator, a rotor temperature by adding the cooling temperature of the motor and the temperature variation of the rotor,
wherein the driving conditions of the motor include a torque instruction, a motor speed, a reference voltage, and a switching frequency.

2. The method of claim 1, wherein the motor is an embedded permanent magnet type of synchronous electric motor.

3. The method of claim 1, wherein the determination of the energy loss of the motor uses response surface modeling and an approximate model as an actual measured data-based energy loss model.

4. The method of claim 1, wherein the determination of the temperature variation of the rotor of the motor calculates the thermal resistances by using a thermal impedance model as an actual measured data-based thermal model.

5. The method of claim 4, wherein the thermal resistances are calculated by using the thermal impedance model expressed in the following function:

$$Z_{th\_total}(t) = \sum_{i=1}^{n} R_i \left(1 - e^{-\frac{t}{\tau_i}}\right)$$

wherein $Z_{th\_total}$ is overall thermal impedance, R is thermal resistance, and t is measurement time.

6. A system for estimating temperature of a rotor of a motor, comprising:
a motor configured to operate as a driving motor of an environmentally-friendly vehicle; and
an energy loss module configured to determine an energy loss of the motor using driving conditions of the motor;
a rotor temperature variation calculation module configured to determine a temperature variation of the rotor at a cooling temperature of the motor using the determined energy loss and thermal resistances of the rotor and a stator of the motor; and
an estimator configured to estimate a rotor temperature by adding the cooling temperature of the motor and the temperature variation of the rotor,
wherein the driving conditions of the motor include a torque instruction, a motor speed, a reference voltage, and a switching frequency.

7. The system of claim 6, wherein the motor is an embedded permanent magnet type of synchronous electric motor.

8. The system of claim 6, wherein the determination of the energy loss of the motor uses response surface modeling and an approximate model as an actual measured data-based energy loss model.

9. The system of claim 6, wherein the determination of the temperature variation of the rotor of the motor calculates the thermal resistances by using a thermal impedance model as an actual measured data-based thermal model.

10. The system of claim 9, wherein the thermal resistances are calculated by using the thermal impedance model expressed in the following function:

$$Z_{th\_total}(t) = \sum_{i=1}^{n} R_i \left(1 - e^{-\frac{t}{\tau_i}}\right)$$

wherein $Z_{th\_total}$ is overall thermal impedance, R is thermal resistance, and t is measurement time.

11. A non-transitory computer readable medium containing instructions executed by a controller, the computer readable medium comprising:
controlling a motor to operate as a driving motor of an environmentally-friendly vehicle; and
determining an energy loss of the motor using driving conditions of the motor;
determining a temperature variation of the rotor at a cooling temperature of the motor using the determined energy loss and thermal resistances of the rotor and a stator of the motor; and
estimating a rotor temperature by adding the cooling temperature of the motor and the temperature variation of the rotor,
wherein the driving conditions of the motor include a torque instruction, a motor speed, a reference voltage, and a switching frequency.

12. The non-transitory computer readable medium of claim 11, wherein the motor is an embedded permanent magnet type of synchronous electric motor.

13. The non-transitory computer readable medium of claim 11, wherein the determination of the energy loss of the motor uses response surface modeling and an approximate model as an actual measured data-based energy loss model.

14. The non-transitory computer readable medium of claim 11, wherein the determination of the temperature variation of the rotor of the motor calculates the thermal resistances by using a thermal impedance model as an actual measured data-based thermal model.

\* \* \* \* \*